(12) United States Patent
Wu et al.

(10) Patent No.: US 9,460,007 B1
(45) Date of Patent: Oct. 4, 2016

(54) PROGRAMMABLE HARDWARE BLOCKS FOR TIME-SHARING ARITHMETIC UNITS USING MEMORY MAPPING OF PERIODIC FUNCTIONS

(71) Applicant: Xilinx, Inc., San Jose, CA (US)

(72) Inventors: Ephrem C. Wu, San Mateo, CA (US); Xiaoqian Zhang, San Jose, CA (US)

(73) Assignee: XILINX, INC., San Jose, CA (US)

(*) Notice: Subject to any disclaimer, the term of this patent is extended or adjusted under 35 U.S.C. 154(b) by 112 days.

(21) Appl. No.: 14/494,941

(22) Filed: Sep. 24, 2014

(51) Int. Cl.
*G06F 12/00* (2006.01)
*G06F 13/00* (2006.01)
*G06F 12/02* (2006.01)
*G06F 9/30* (2006.01)

(52) U.S. Cl.
CPC ......... *G06F 12/0246* (2013.01); *G06F 9/3001* (2013.01); *G06F 9/3004* (2013.01); *G06F 2212/7201* (2013.01)

(58) Field of Classification Search
None
See application file for complete search history.

(56) References Cited

U.S. PATENT DOCUMENTS

| 6,434,161 B1* | 8/2002 | Higbee | G06F 13/105 370/413 |
| 7,822,881 B2* | 10/2010 | Vorbach | G06F 15/7867 710/1 |
| 8,429,634 B2* | 4/2013 | Dembo | G06F 8/447 712/202 |
| 2003/0009651 A1* | 1/2003 | Najam | G06F 15/7864 712/34 |
| 2003/0016690 A1* | 1/2003 | Jordan | H04J 3/1617 370/433 |
| 2013/0322501 A1* | 12/2013 | Takeuchi | H03M 13/091 375/219 |

* cited by examiner

*Primary Examiner* — Sean D Rossiter
(74) *Attorney, Agent, or Firm* — W. Eric Webostad

(57) ABSTRACT

An apparatus relates generally to time sharing of an arithmetic unit. In such an apparatus, a controller is coupled to provide read pointers and write pointers. A memory block is coupled to receive the read pointers and the write pointers. A selection network is coupled to the memory block and the arithmetic unit. The memory block includes a write-data network, a read-data network, and memory banks.

20 Claims, 9 Drawing Sheets

PROGRAMMABLE HARDWARE BLOCKS FOR TIME-SHARING ARITHMETIC UNITS USING MEMORY MAPPING OF PERIODIC FUNCTIONS

TECHNICAL FIELD

The following description relates to integrated circuit devices ("ICs"). More particularly, the following description relates to programmable hardware blocks for time-sharing arithmetic units of an IC using memory mapping of periodic functions.

BACKGROUND

Complex integrated circuits, such as Field Programmable Gate Arrays ("FPGAs"), Application-Specific Standard Products ("ASSPs"), and other types of programmable hardware Systems-on-a-Chip ("SoCs"), have become more "dense" over time, i.e., more logic features have been implemented in an IC of a given size. Unfortunately, this complexity has not always translated to a user being easily able to take full advantage of such added complexity. Moreover, in some instances, an underutilization of features of complex integrated circuits has resulted in bandwidth limitations, meaning that such complex integrated circuits were not used for some high-speed forms of mobile communication.

Hence, it is desirable and useful to provide a programmable hardware IC that overcomes one or more of the above-identified limitations.

SUMMARY

An apparatus relates generally to time sharing of an arithmetic unit. In such an apparatus, a controller is coupled to provide read pointers and write pointers. A memory block is coupled to receive the read pointers and the write pointers. A selection network is coupled to the memory block and the arithmetic unit. The memory block includes a write-data network, a read-data network, and memory banks.

A system relates generally to time sharing of arithmetic units. In such a system, programmable hardware blocks include distribution units. Each of the distribution units includes: a controller coupled to provide read pointers and write pointers; a memory block coupled to receive the read pointers and the write pointers; and a selection network coupled to the memory block and an arithmetic unit of the arithmetic units. The memory block includes a write-data network, a read-data network, and memory banks. The memory banks are coupled between the write-data network and the read-data network.

A method relates generally to configuration of an integrated circuit device. In such a method, memory of programmable hardware blocks is mapped to provide a first function and a second function via a cascade of the programmable hardware blocks. The programmable hardware blocks include arithmetic units and distribution units. Operation of each of the distribution units includes: providing read pointers and write pointers by a controller; receiving the read pointers and the write pointers by a memory block; and dynamically controlling a selection network coupled to the memory block with the read pointers and the write pointers for time multiplexing and context switching for operation of an arithmetic unit of the arithmetic units. Interleaved input data is processed to provide interleaved output data for the first function and the second function using the time multiplexing and the context switching in the cascade of the programmable hardware blocks.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

DETAILED DESCRIPTION

Figure 1:
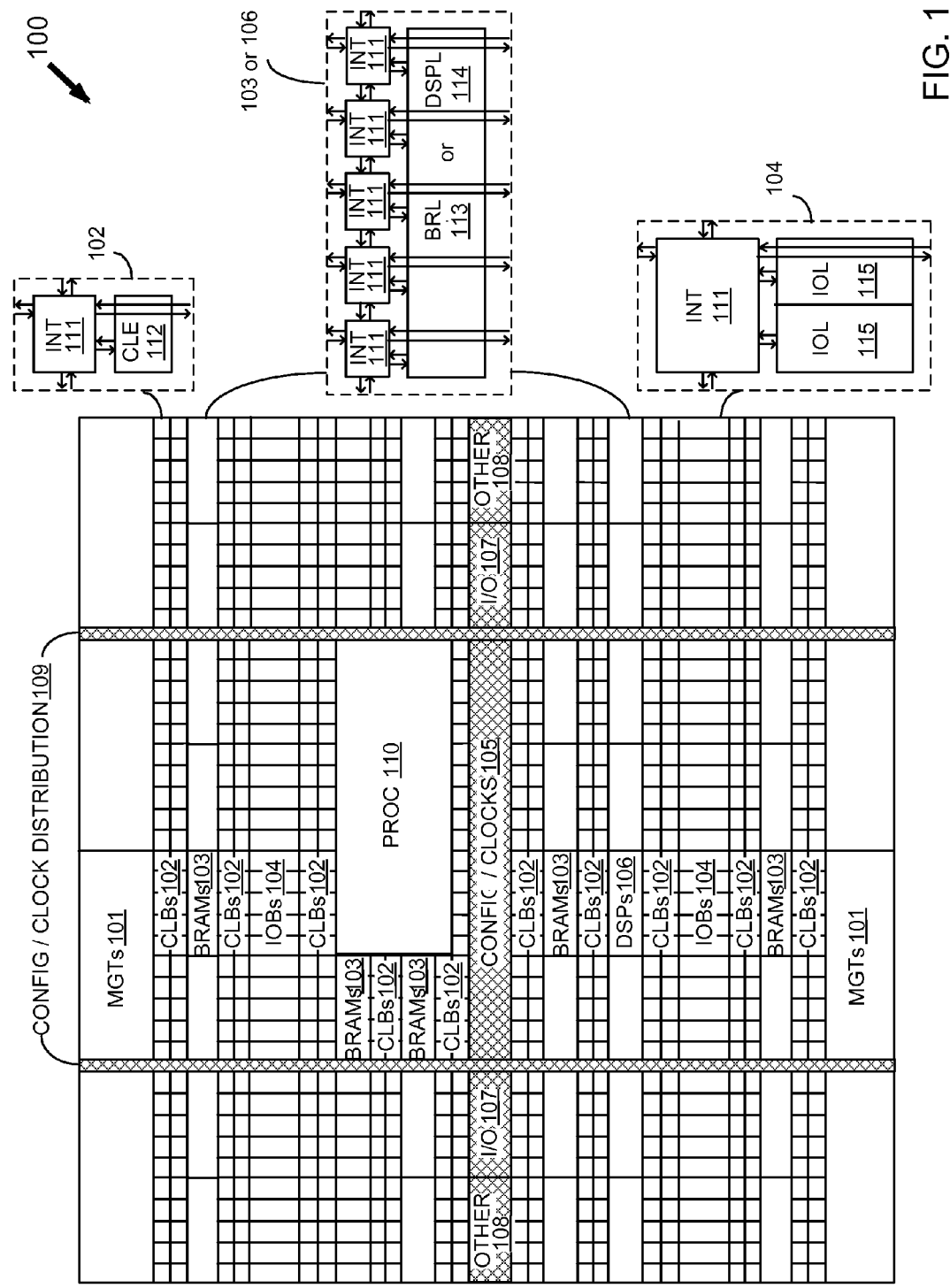
FIG. 1 is a simplified block diagram depicting an exemplary columnar Field Programmable Gate Array ("FPGA") architecture.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Before describing the examples illustratively depicted in the several figures, a general introduction is provided to further understanding.

In the past, logic between digital signal processing blocks was a limiter with respect to speed and size of implementation of a digital signal processing algorithm in a programmable logic array device, such as a Field Programmable Gate Arrays ("FPGAs") for example. As described below, programmable hardware blocks may be configured for one of a number of different modes, and such programmable hardware blocks may be cascaded to perform a function. This allows for signal processing in a canonical form without the limiting logic of the past, namely speed limiting logic located between adjacent programmable hardware blocks.

Signal-processing algorithms may have common patterns. For example, a sliding window of samples over time operated on by some other samples or a set of coefficients is one such common pattern used in finite impulse response ("FIR") filters, motion estimators, and correlators. As described below, an array of programmable hardware blocks may be cascaded to provide a function, and with such replication of such blocks, pitch-matching of these patterns may be used for compact, high-speed, low-power implementations of such signal processing algorithms.

These programmable hardware blocks include a tight coupling of small memory banks to an arithmetic unit. With reference to FPGAs, conventional FPGA interconnects, or more generally "glue logic," between such programmable hardware blocks may be avoided for reduced area and increased speed.

Effectively, a data path machine, namely a programmable vector processor that does not require any program counters, may be assembled with a concatenation of programmable hardware blocks programmed to perform a function, where memory in each of such hardware blocks programmed may be used to direct dataflow. Such data path machine may use systolic arrays, which may be used to implement loops. Loops in a general-purpose processor typically incur loop set-up overhead. However, systolic arrays as described below may reduce memory accesses by exploiting data locality, namely data may be passed from one systolic array to a next systolic array for further processing without incurring any memory access for such passage. Accordingly, memory bandwidth may be conserved and/or wire length for data propagation may be reduced.

Because one or more of the examples described herein may be implemented in an FPGA, a detailed description of such an IC is provided. However, it should be understood that other types of ICs may benefit from the technology described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An 10B 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a horizontal area near the center of the die (shown in FIG. 1) is used for configuration, clock, and other control logic. Vertical columns 109 extending from this horizontal area or column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

With the above general understanding borne in mind, various configurations for time sharing of an arithmetic unit are generally described below.

Figure 2:
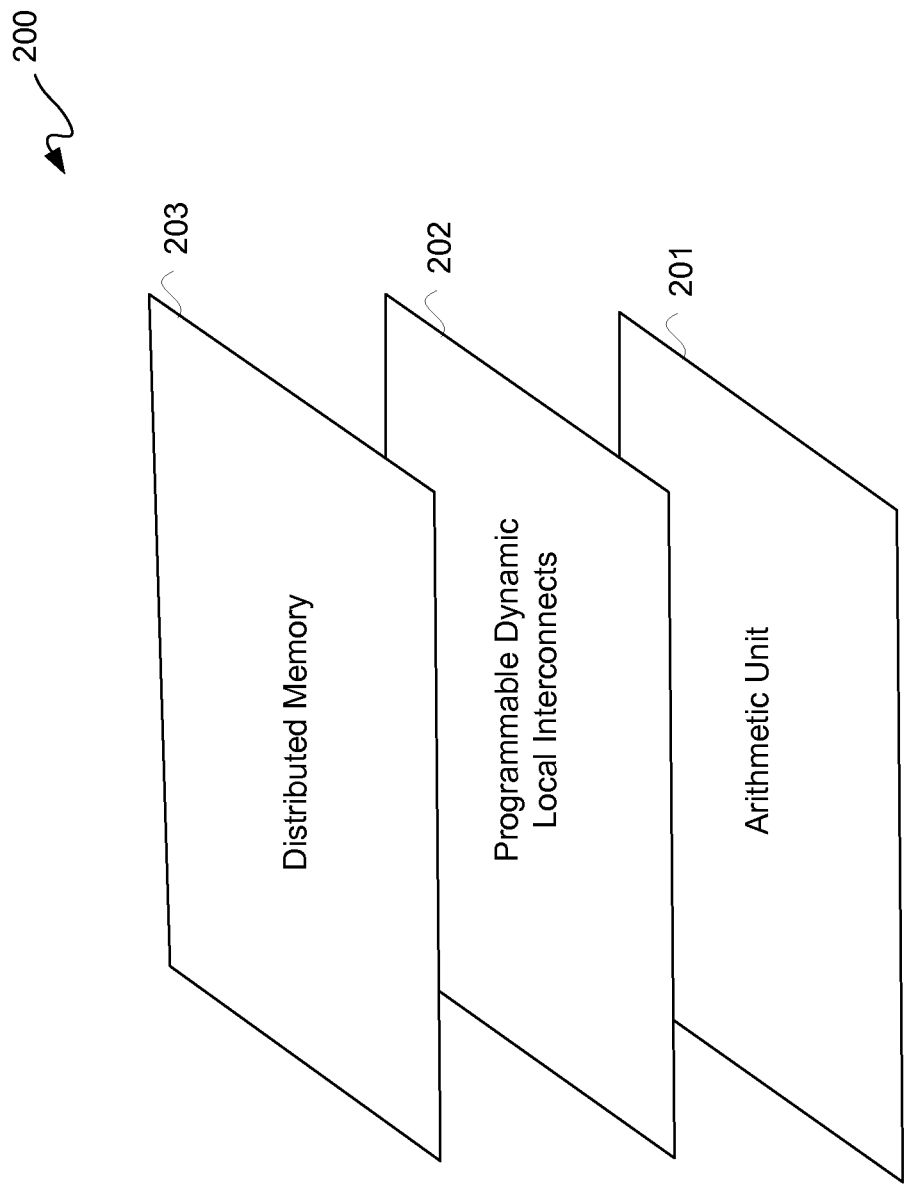
FIG. 2 is a block diagram depicting an exemplary set of logical layers for forming a programmable hardware block that may be used for time sharing of an arithmetic unit.

FIG. 2 is a block diagram depicting an exemplary set of logical layers 200 for forming a programmable hardware block that may be used for time sharing of an arithmetic unit 201. For purposes of clarity by way of example, such arithmetic unit 201 being shared is described below as being a modified DSP 106 of an FPGA 100. However, it should be understood that other types of arithmetic units 201 may be used with the technology described herein.

Layered on an arithmetic unit 201 may be programmable dynamic local interconnects 202. Such programmable dynamic local interconnects 202 may be disposed within such a programmable hardware block, and such programmable hardware block may include an arithmetic unit 201. For control and configuration of such existing arithmetic unit 201 and programmable dynamic local interconnects 202, distributed memory 203 may be layered on such arithmetic unit 201 and programmable dynamic local interconnects 202. Such distributed memory 203 may likewise be included in such programmable hardware block.

Figure 3:
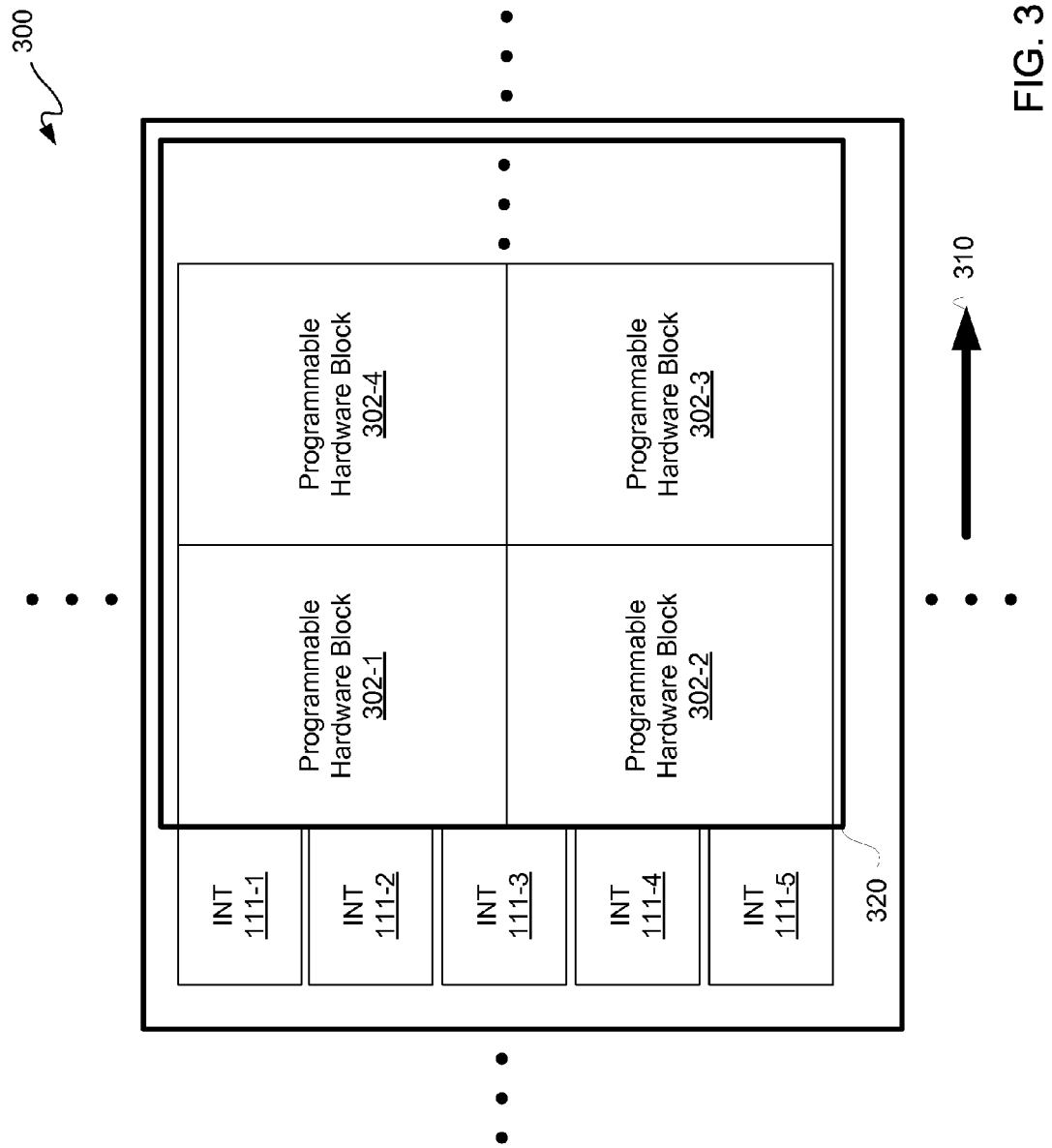
FIG. 3 is a block diagram depicting an exemplary layout for a set or array of time sharable programmable hardware blocks coupled within an FPGA.

FIG. 3 is a block diagram depicting an exemplary layout 300 for a set or array of time sharable programmable hardware blocks 320 coupled within an FPGA. In this example, four programmable hardware blocks 302-1 through 302-4 are coupled in a two-by-two array 320.

A one-by-five column of FPGA programmable interconnect elements ("INTs") 111-1 through 111-5 in layout 300 may lead a direction of data flow 310 for input of data into an array of programmable hardware blocks 302-1 through 302-4. Such layout 300, or a subset thereof such as array 320, may be replicated within an FPGA to form rows and/or columns thereof. Furthermore, the number of programmable hardware blocks 302 within an array 320 may generally be equal to or greater than two. The number of INTs 111 may be other than five in other implementations, subject to integrated circuit scaling.

Figure 4:
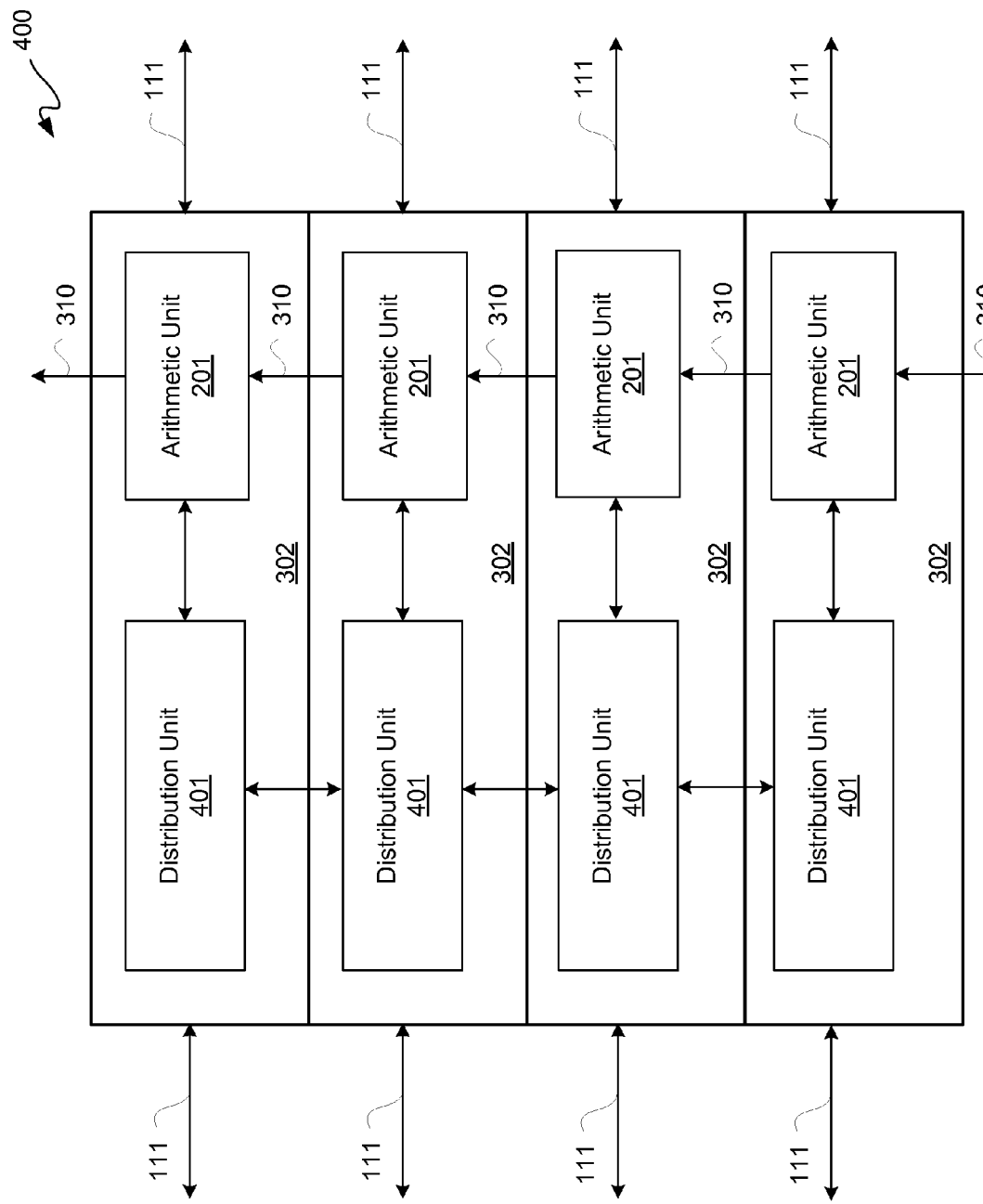
FIG. 4 is a block diagram depicting an exemplary cascade of programmable hardware blocks.

FIG. 4 is a block diagram depicting an exemplary cascade 400 of programmable hardware blocks 302. Even though four programmable hardware blocks 302 are illustratively depicted, at least two or more programmable hardware blocks 302 may be coupled to one another in a series.

Each of programmable hardware blocks 302 may be coupled to programmable fabric resources of an FPGA via INTs 111. Each of programmable hardware blocks 302 may include a local memory with control logic distribution block or unit 401 and an arithmetic unit 201. Arithmetic units 201 of such programmable hardware blocks 302 may be coupled in a series, as generally indicated by data flow arrows 310. Within each of programmable hardware blocks 302, an arithmetic unit 201 thereof may be coupled to a local memory with control logic distribution block 401 corresponding thereto. Furthermore, nearest neighbor or adjacent local memory with control logic distribution blocks 401 of corresponding programmable hardware blocks 302 may be coupled to one another. Again, for purposes of clarity by way of example and not limitation, a modified DSP 106 is described below as a time sharable arithmetic unit. However, other types of arithmetic units may be used in other examples.

Figure 5:
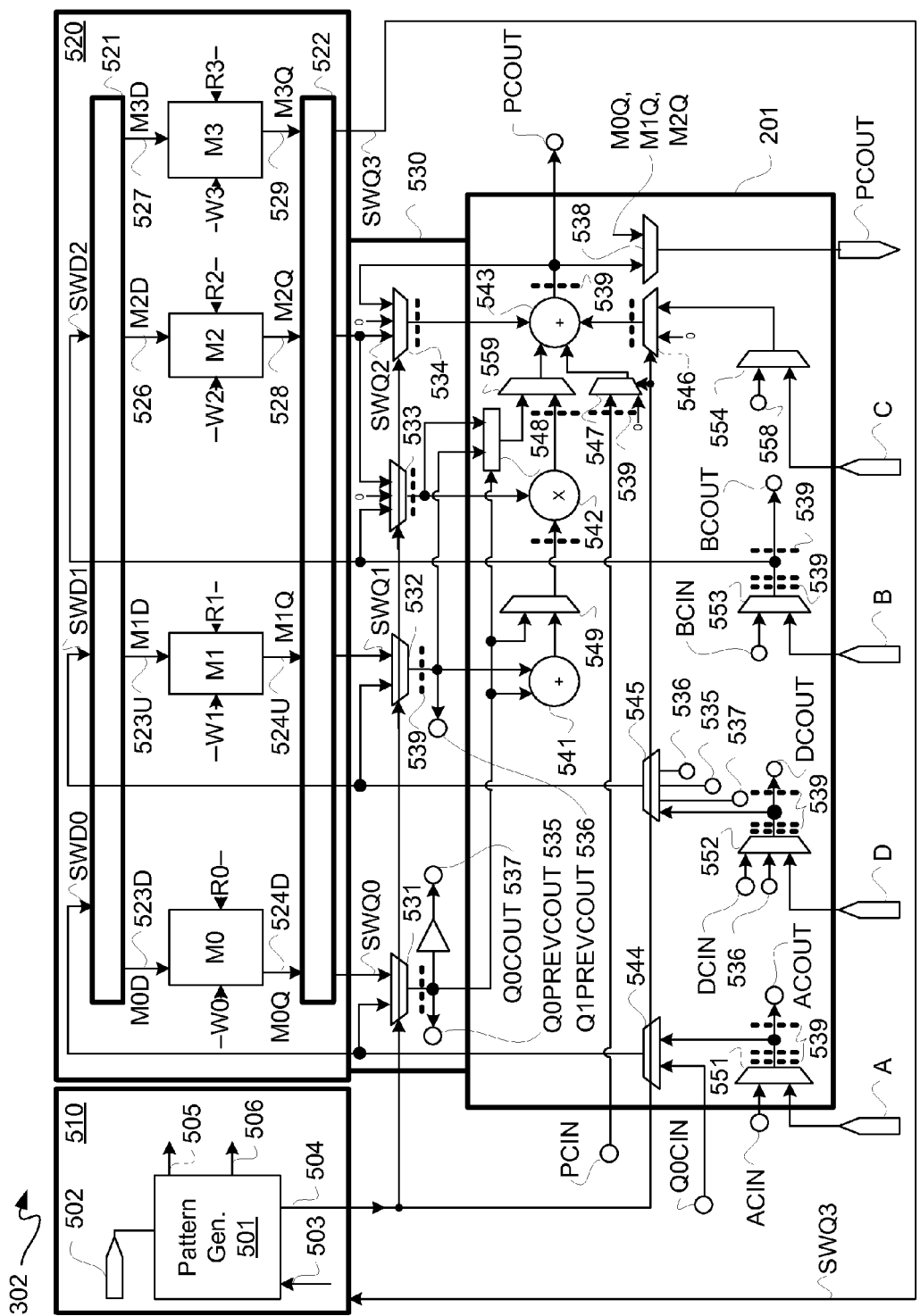
FIG. 5 is a schematic diagram depicting an exemplary programmable hardware block.

FIG. 5 is a schematic diagram depicting an exemplary programmable hardware block 302. In this example, a modified DSP48 architecture of an FPGA from Xilinx, Inc. of San Jose, Calif. is described as a backdrop for a time sharable arithmetic unit. Accordingly, for purposes of clarity and not limitation, known details regarding a conventional DSP48 are not described in unnecessary detail. Moreover, even though single arrows or traces are illustratively depicted for purposes of clarity, in an implementation such single arrows or traces may represent single signals or multiple signals of signal buses.

Programmable hardware block 302 includes a controller 510. Controller 510 may include a pattern generator 501. Pattern generator 501 may include counters, registers, receive clock signals, and other known components and/or signals for operation of a pattern generator as described herein, which may vary from application-to-application and which are not illustratively depicted for purposes of clarity and not limitation.

Pattern generator 501 may be coupled to receive control data 502 for storing in pattern generator 501. Control data 502 may be used to generate one or more patterns for providing write pointers 505, namely write pointers W0-W3, and read pointers 506, namely read pointers R0-R3. Control data 502 may be information for generating read/write sequences and/or may include selection information to select among a menu of read/write sequences capable of being generated by pattern generator 501. Additionally, control data 502 may include information for generating selects for dynamic multiplexer ("mux") selects 504. Physically, mux selects may come out of memory bank M3 of memory banks M0-M3. However, generally mux selects may logically be selected by controller 510, such as by state machines of pattern generator 501, and such mux selects can, but do not have to, come out of memory bank M3 in other implementations. For example, some or all of the outputs of memory banks M0-M3 may be routed to controller 510, and controller 510 may transform these memory output bits into mux selects 504 based on control data 502 inputs. Optionally, pointer overrides 503 may be provided from FPGA programmable fabric resources to pattern generator 501. With reference to a DSP48, pointer overrides 503 may be for C and/or A1 signals.

Programmable hardware block 302 includes a memory block 520. Memory block 520 may include memory banks M0-M3 coupled to respectively receive read pointers R0-R3 and write pointers W0-W3. Memory block 520 may further include a memory write-data network 521 and a memory read-data network 522. Memory banks M0-M3 may be coupled between write-data network 521 and read-data network 522. Memory banks M0-M3 may be integrated memory banks with built-in counters for sequencing off of starting write and read pointers responsive to clocking with a clock signal for synchronous operation.

Data ("M0D") 523D, which may be for configuring a "downstream" or forward delay line, may be written from write-data network 521 to memory bank M0. Data ("M1D") 523U, which may be for configuring an "upstream" or reverse delay line, may be written from write-data network 521 to memory bank M1. By "downstream," it is generally meant a direction the same as that of an output direction, and by "upstream," it is generally meant a direction opposite to that of an output direction. Along those lines, a downstream delay line may in effect take samples forwards, and an upstream delay line may in effect take samples backwards. Delay lines of M0 and M1 may be cross-connected for filters with even- or odd-symmetry.

Data ("M2D") 526, which may be filter coefficients, may be written from write-data network 521 to memory bank M2. Data ("M3D") 527, which may be sequencer data, may be written from write-data network 521 to memory bank M3. Mux select bits may be stored in memory bank M3. Memory bank M3 may thus be configured to provide a sequencer to provide control select signals to a dynamically controlled selection network including muxes. Such dynamically controlled muxes 531-533 and 544-547 may be controlled by mux select bits stored in memory bank M3 and output from read-data network 522 as switch context output data SWQ3.

Memory banks M0-M3 may be multiple rows deep, which in this example is 64 rows deep by 18-bits wide for each row of synchronous SRAM. However, other memory sizes may be used in other implementations.

Data ("M0Q") 524D, which may be for configuring a "downstream" delay line, may be read from memory bank M0 to read-data network 522. Data ("M1Q") 524U, which may be for configuring an "upstream" delay line, may be read from memory bank M1 to read-data network 522. Data ("M2Q") 528, which may be filter coefficients, may be read from memory bank M2 to read-data network 522. Data ("M3Q") 529, which may be cyclic sequencer or scheduler data, may be read from memory bank M3 to read-data network 522 for output as previously described. Such cyclic schedules may be used to implement time-sharing of an arithmetic unit 201 corresponding to a memory bank M3 where both are of a same programmable hardware block 302.

Accordingly, it should be understood that generally memory banks M0 and M1 are circular buffers, and thus to implement corresponding delay lines, read pointers for reading from such circular buffers may be incremented or decremented by a counter thereof. Likewise, with context switching, filter coefficients for one filter may be replaced with filter coefficients for another filter dynamically, namely without skipping clock cycles, by having corresponding read pointers for reading from such circular buffers being incremented or decremented. Thus, there may be some overlap with respect to read and write pointers. Sequencer data may be used for controlling context switching of such data.

In general, logic, as well as filter coefficients, may be represented as bit patterns written to and read from rows of memory M0 and M1, as well as M2. The number of bits used may vary from application-to-application. In this implementation, 18 bits or less may be used for each write or read; however, in other implementations fewer or more than 18-bits per row may be used.

Thus, a user may map a design to bit patterns. Such patterns may be circularly buffered in one or more of such memory banks of memory block 520 to represent a cyclic or periodic function. This writing and reading may be controlled by sequencing data in M3, and this sequencing may further be used for context switching among different functions mapped to memory block 520. In this example, any function is to be periodic within 64 cycles, as there are 64 rows in memory banks in this implementation. If more than one function is implemented at a time, then there are fewer rows to be used for each such periodic function in this implementation. However, if more rows of memory are used in other implementations, than a longer time between a periodic repetition may be implemented. Moreover, memory banks M0-M3 may include programmably set pointer constants for managing multiple circular first-in, first-out buffers.

A dynamically controlled selection network 530 of programmable hardware block 302 may be coupled to memory block 520 and an arithmetic unit 201. Dynamically controlled selection network 530 may include a plurality of multiplexers, generally depicted as multiplexers 531-533. Select control signals ("selects") of selects 504 from pattern generator 501 may be used to dynamically select outputs of multiplexers 531-533; however, read data M3Q may be provided as context switching output data SWQ3 from read-data network 522 responsive to read data 529 M3Q. Such context switching output data SWQ3 may be provided to controller 510 to provide mux selects 504, such as previously described. Mux selects 504 may be provided as control selects to dynamically select context for context switchable multiplexers, as described herein.

From read-data network 522, context switching output data, namely SWQ0, SWQ1, and SWQ2, may be respectively provided as inputs to multiplexers ("muxes") 531, 532, 533 corresponding to read data M0Q, M1Q, M2Q. Additionally such context switching output SWQ2 may be provided as input to mux 534. Control selects 504 may be provided from read data M3Q, as previously described, for context switching of muxes 531-534. Furthermore, context switching input data, namely SWD0, SWD1, SWD2, which may correspond to context switching output data SWQ0, SWQ1, and SWQ2, may be provided to write-data network 521 from another programmable hardware block 302. Such context switching input data SWD0, SWD1, SWD2 may correspondingly be input to muxes 531-533. Other inputs to muxes 533 and 534 may be a ground or logic 0, and another input to mux 534 may be an output of accumulator or post-multiplier adder ("post-adder") 543 of arithmetic unit 201.

Controller 510, memory block 520, and selection network 530 as described above may collectively be a distribution unit or block 401 of a programmable hardware block 302. Before continuing the description of the exemplary programmable hardware block 302 of FIG. 5, some examples are provided below to enhance understanding.

Figure 6:
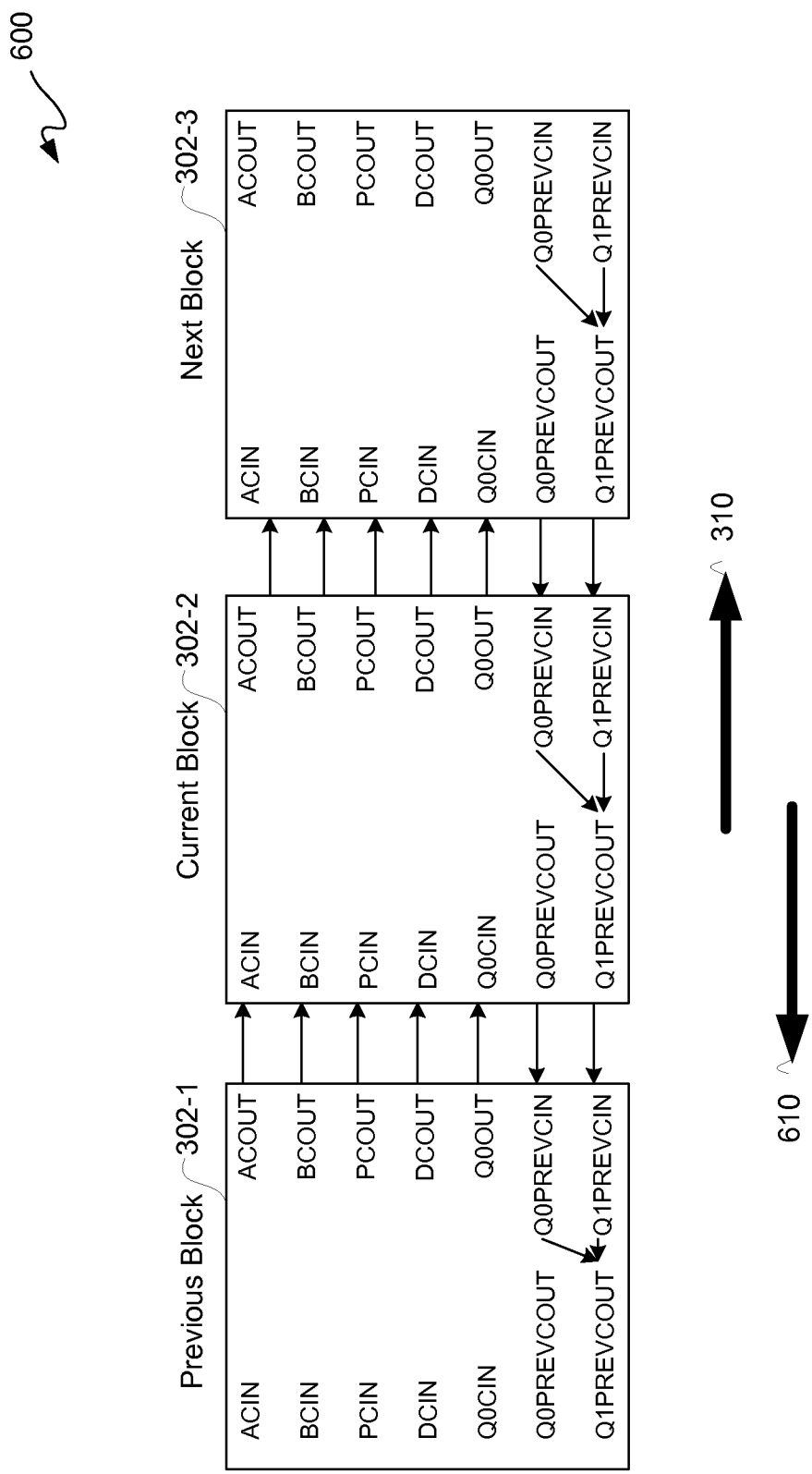
FIG. 6 is a block diagram depicting an exemplary cascade of three programmable hardware blocks.

FIG. 6 is a block diagram depicting an exemplary cascade 600 of three programmable hardware blocks 302-1 through 302-3. Programmable hardware blocks 302-1 through 302-3 may respectively be thought of as a previous ("PREV") block, a current block, and a next ("NXT") block. Each of programmable hardware blocks 302-1 through 302-3 includes inputs ACIN, BCIN, PCIN, DCIN, Q0CIN, Q0PREVCIN, and Q1PREVCIN. Each of programmable hardware blocks 302-1 through 302-3 includes corresponding outputs ACOUT, BCOUT, PCOUT, DCOUT, Q0COUT, Q0PREVCOUT, and Q1PREVCOUT. As many of these signals are already known with reference to a DSP48, generally only the added signals are described for purposes of clarity and not limitation.

For cascade 600, Q0PREVCOUT and Q1PREVCOUT of next programmable hardware block 302-3 are respectively coupled to Q0PREVCIN and Q1PREVCIN of adjacent current programmable hardware block 302-2. Likewise for cascade 600, Q0PREVCOUT and Q1PREVCOUT of current programmable hardware block 302-2 are respectively coupled to Q0PREVCIN and Q1PREVCIN of adjacent previous programmable hardware block 302-1. These couplings correspond to an upstream direction of dataflow 610. Within each of programmable hardware blocks 302-1 through 302-3, either Q0PREVCOUT or Q1PREVCOUT may be provided as Q1PREVCOUT.

For cascade 600, ACIN, BCIN, PCIN, DCIN, Q0CIN of current programmable hardware block 302-2 are respectively coupled to ACOUT, BCOUT, PCOUT, DCOUT, Q0COUT of adjacent previous programmable hardware block 302-1. Likewise for cascade 600, ACIN, BCIN, PCIN, DCIN, Q0CIN of next programmable hardware block 302-3 are respectively coupled to ACOUT, BCOUT, PCOUT, DCOUT, Q0COUT of adjacent current programmable hardware block 302-2. These couplings correspond to a downstream direction of dataflow 310.

Thus, a conventional DSP48 has A and B cascades. However, a D cascade is added here for a symmetric filter sample re-entrant. This is described below in additional detail with reference to cyclic scheduling.

Returning to FIG. 5, thick dotted lines 539 generally indicate various pipeline registers, which may be statically configured with configuration memory bits, and which may be bypassed. Such registers may be used for pipelined flow.

Outputs of muxes 544 and 545 may be SWD0 and SWD1, respectively, for input to write-data network 521. SWD2 may be output from mux 553 for input to write-data network 521. Q0COUT 537 and Q0PREVCOUT 535 may be output from mux 531 for input to a preadder 541, muxes 545 and 549, and a concatenation block ("concatenator") 548, and Q1PREVCOUT 536 may be output from mux 532 for input to preadder 541, concatenator 548, and muxes 552 and 545.

Output of mux 533 may be input to concatenator 548 and multiplier 542. Along those lines, filter coefficients or other multiplicands in memory bank M2 may be respectively multiplied with other multiplier inputs provided to multiplier 542. Output of mux 549 may be input to multiplier 542 as a multiplier input. These inputs to multiplier 542 may be time division multiplexed responsive to a cyclic schedule.

Output of mux 534 may be input to post-adder 543. Output of post-adder 543 may be provided as an input to mux 538, along with any one or more of M0Q, M1Q, or M2Q. Having an extra input to post-adder 543 may allow for simultaneous addition of a multiplier product, accumulator value, either an external C input or a rounding input, and an output of a previous programmable hardware block 302 in a cascade thereof.

PCIN and a logic 0 may be inputs to mux 547, and output of mux 547 may be provided to post-adder 543. Output of a concatenator 548 may be input to mux 559, and output of mux 559 may be input to adder 543.

Selects for muxes 549 and 559 may be controlled by dynamically selected pins. Selects for muxes 551-554, as well as mux 538, may be statically selected by configuration memory bits. Inputs A, D, B, and C may respectively be inputs of muxes 551-554. Muxes 551-553 may respectively be coupled to receive ACIN, DCIN, and BCIN and respectively be sources for ACOUT, DCOUT, and BCOUT.

ACOUT and Q0CIN may be inputs of mux 544. DCOUT may be another input of mux 545. Another input to mux 554 may be PCOUT from another block, namely signal 558.

Output of mux 554, along with a logic 0, may be inputs to mux 546, and output of mux 546 may be another input to post-adder 543. Output of post-adder 543 may be PCOUT, and output of mux 538 may be PCOUT or another selected output.

A first block in a systolic array may select input A. A first element in a systolic array may further select Q1PREVCOUT. Input B may be used as a coefficient update port. Input C may be used to add partial results from a series of blocks in a systolic array.

With the above description borne in mind, it should be understood that memory may be scalable with respect to an application to be implemented. Along those lines, even though an FPGA is described, other types of integrated circuits may benefit from using the technology described herein. Additionally, a DSP or other type of arithmetic unit may be time-shared. Moreover, time-sharing of pointer logic may be provided. Along those lines, arithmetic unit 201 may be collocated and/or co-located with a logic unit. With respect to the former, an arithmetic unit 201, such as a DSP48 of currently available FPGAs of Xilinx, Inc. for example, may be collocated with a logic unit to form an arithmetic logic unit ("ALU"). Along those lines, such an ALU may be time-shared.

Figure 7:
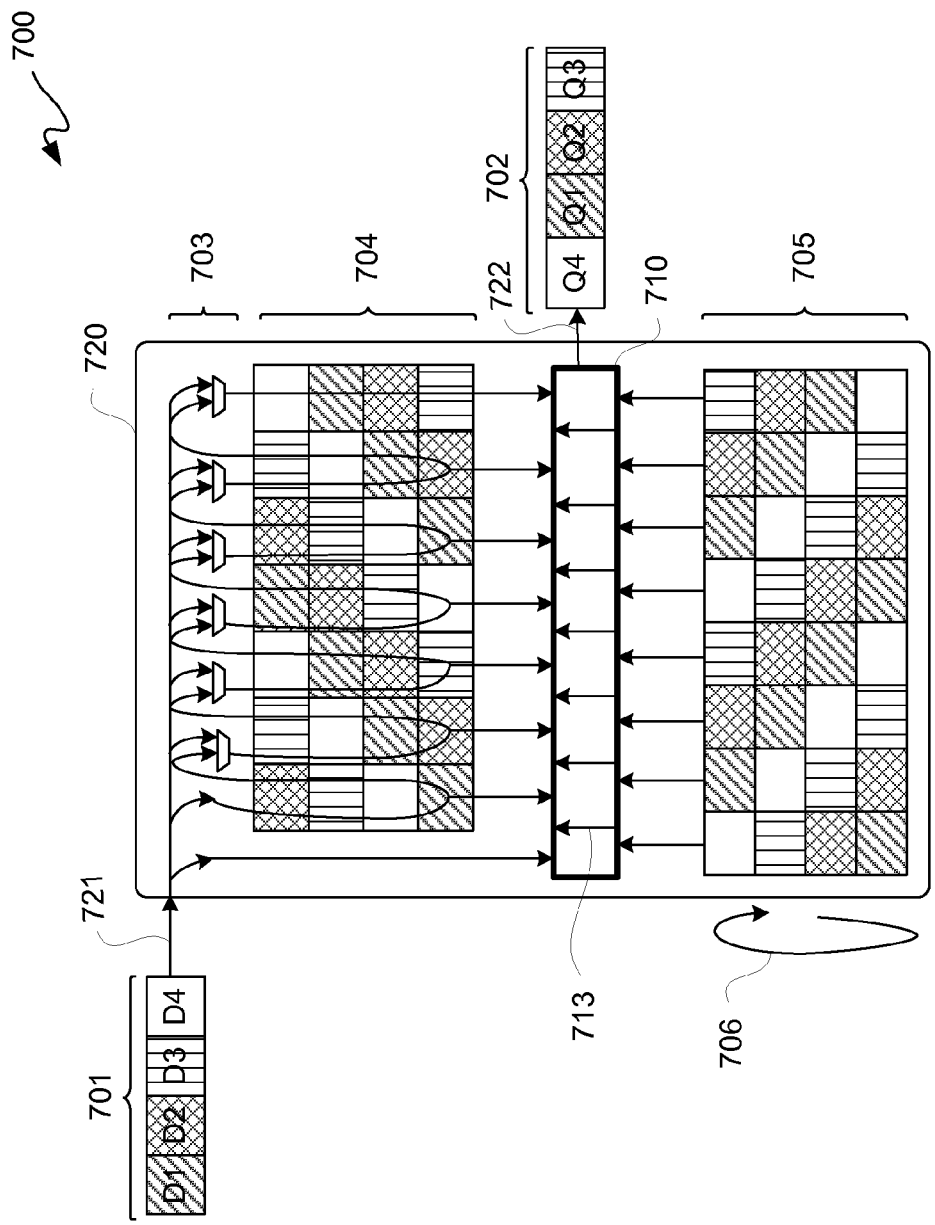
FIG. 7 is a block diagram depicting an exemplary interleaved data flow.

FIG. 7 is a block diagram depicting an exemplary interleaved data flow 700. FIG. 7 is further described with simultaneous reference to FIGS. 1-7.

Interleaved data flow 700 may begin with accessing an integrated circuit device, such as FPGA 100 for example, having an array 320 of time sharable programmable hardware blocks 302. A single programmable hardware block 302 of such array 320 or more than one of such programmable hardware blocks 302 of such array 320 may be accessed for memory mapping to provide one or more functions 720. For purposes of clarity by way of example and not limitation, it shall be assumed that functions 720 are four respective filters for a radio used to communicate over different channels and/or different bands, such as within same or different channels. Moreover, for purposes of clarity by way of example and not limitation, it shall be assumed that two or more programmable hardware blocks 302 are cascaded to provide functions 720. However, a single programmable hardware block 302 may be used to provide one or more functions.

Along the above lines, input data stream 701 may have interleaved data, namely respectively D1, D2, D3, D4, where unidirectional diagonal lines, crossing diagonal lines, vertical lines, and no lines in each block indicate operations and/or data respectively associated with four separate filters respectively for D1, D2, D3, D4.

Delay lines 704 may be formed responsive to memory mapping. Such delay lines may be configured by memory mapping memory bank M0. For a symmetric filter, delay lines in both downstream and upstream directions may be memory mapped to memory banks M0 and M1, respectively. However, for purposes of clarity by way of example and not limitation, only downstream delay lines 704 are illustratively depicted.

Input data stream 701 may be directly provided to time shared arithmetic units 201 of programmable hardware blocks 302, which time shared arithmetic units 201 are coupled in a cascade 710. Additionally, outputs from delay lines 704 may be provided to such cascade 710 of time shared arithmetic units.

A delay line of delay lines 704 may be directly coupled to receive input data stream 701, and a remainder of delay lines 704 may be coupled to receive input data stream through dynamically programmable interconnects 703 of programmable hardware blocks 302. Pattern generators 501 may issue write and read pointers to cause delay lines 704 to circularly rotate data processed through a cascade, where such circularly rotated processed data corresponds to only one set of input data of input data stream 701.

Pattern generators 501 may provide selects for controlling dynamically programmable interconnects 703 of programmable hardware blocks 302 for time division multiplexed input of data from each of delay lines 704 to respective arithmetic units 201 of such cascade 710. Pattern generators 501 may further provide selects for controlling dynamically programmable interconnects 703 of programmable hardware blocks 302 for time division multiplexed input of coefficients 705 from memory banks M2 to respective arithmetic units 201 of such cascade 710.

Controlling application of coefficients 705 from memory banks M2 to cascade 710 may be sequenced or scheduled according to sequence or schedule data in memory banks M3, as generally indicated by arrow 706. Along those lines, coefficients 705 and corresponding data directly from input data stream 701 and from delay lines 704 arrive at cascade 710 in respective time slots, as generally indicated by arrows 713, for time division multiplexing. For example, unidirectional diagonal lines in a box for data associated with input data D1 arrives in a same time slot to a shared arithmetic unit as unidirectional diagonal lines in a box for coefficients associated with input data D1. Thus, arrows 713 may additionally generally represent partial results which may be provided to a downstream arithmetic unit 201 for accumulation.

Because programmable hardware blocks 302, and thus corresponding arithmetic units 201 thereof, may be directly cascaded one to another, function 720 may be implemented with just one input interface 721 and one output interface 722. Input interface 721 is for receiving an input data stream 701, as previously described. A final or last arithmetic unit 201 of cascade 710 may produce an interleaved output data stream 702, and so output interface 722 may be used to source such interleaved output data stream 702 from a last arithmetic unit 201 of cascade 710. Having only input and output interfaces 721 and 722 reduces routing fabric usage within an FPGA, namely few INTs 111 may be used for multiple programmable hardware blocks 302.

To recapitulate, pattern generator 501 and memory M0, M2, and M3 of time-sharable programmable hardware blocks 302 may be mapped for example to provide two or more filter functions for communication via two or more difference communication channels or bands for a cascade of arithmetic units 201. Time multiplexing and context switching of cascade 710 of time-sharable arithmetic units 201 is used to process interleaved input data 701 to provide interleaved output data 702 for multiple functions.

Figure 8:
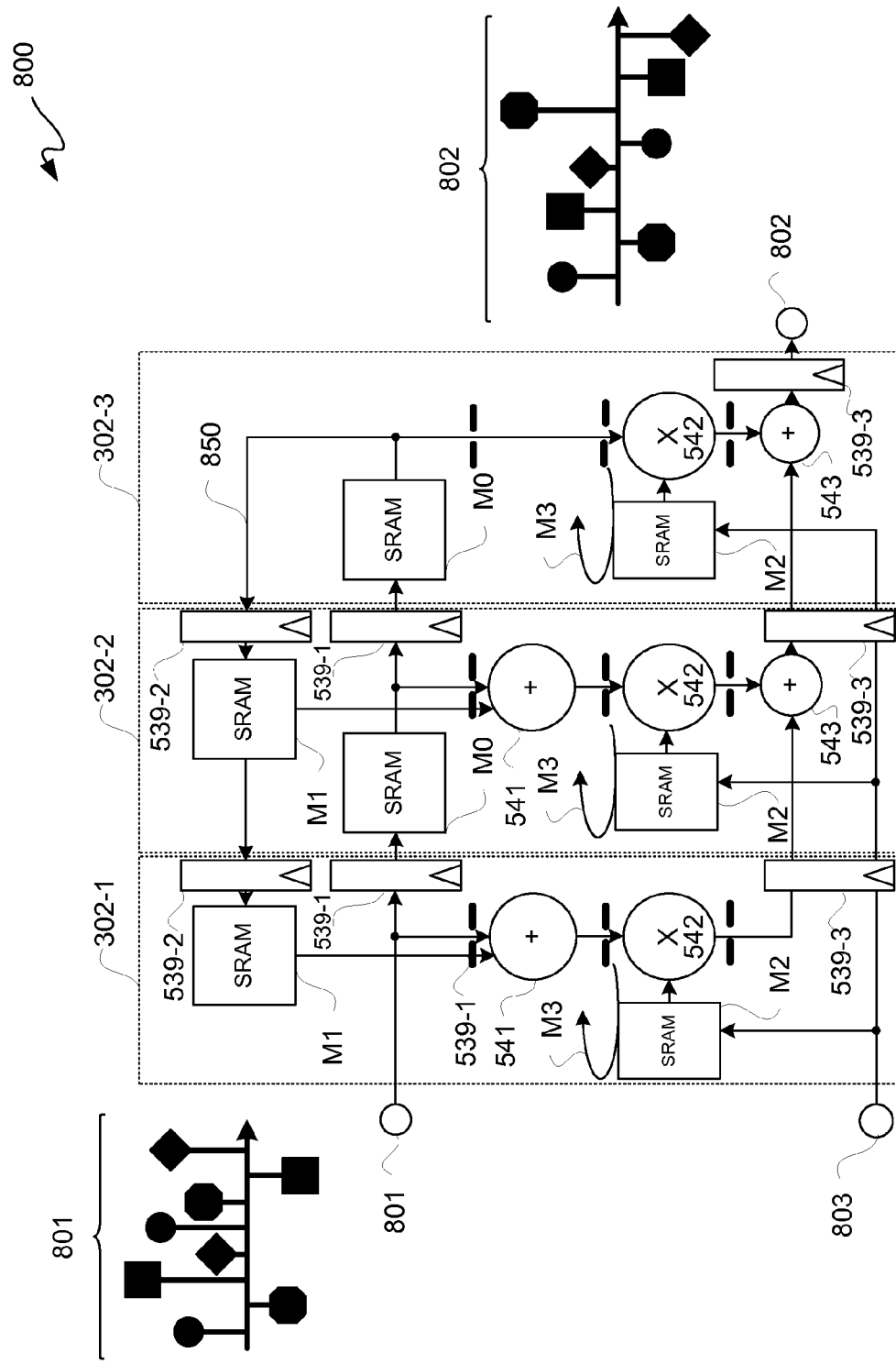
FIG. 8 is a block diagram depicting an exemplary systolic array.

FIG. 8 is a block diagram depicting an exemplary systolic array 800. Systolic array 800 is formed of three cascaded programmable hardware blocks 302-1 through 302-3. A sample input 801, namely input samples, which may be finite impulse responses from multiple channels, are input. Sample input 801 may be composed of samples from different channels, where samples from each channel are respectively depicted with different geometric shapes in sample input 801, as well as corresponding sample output 802. Each sample period for such channels may be substantially longer than a sample period of a DSP clock signal used to clock registers 539 of programmable hardware blocks 302-1 through 302-3. In this example, registers 539 are illustratively depicted for pipelined operation to provide a sample output 802, which likewise may be finite impulse responses from multiple channels. Furthermore, an optional adaptive filter input 803 may be provided.

Sample input 801 may be piped through a feed forward register 539-1 of programmable hardware block 302-1 to a forward delay line formed of memory bank M0 of programmable hardware block 302-2. Sample input 801 output from such forward delay line of programmable hardware block 302-2 may be piped through a feed forward register 539-1 of programmable hardware block 302-2 to a forward delay line formed of memory bank M0 of programmable hardware block 302-3. Sample input 801 output from such forward delay line of programmable hardware block 302-3 may be piped through a feed backward register 539-2 of programmable hardware block 302-2 to a reverse delay line formed of memory bank M1 of programmable hardware block 302-2. This data wraparound path 850 option may or may not be used, as such option is programmably selectable by a mux select of a mux of dynamically controlled selection network 530. In other words, data may be only fed forward, or data may be fed forward and reverse. The later may be used for symmetric filters, namely to fold samples back upon themselves to use corresponding coefficients. Because each of programmable hardware blocks 302 may have this data wraparound path 850 option, cascades of various lengths may be used before optioning in a data wraparound path 850. Sample input 801 output from such reverse delay line of programmable hardware block 302-2 may be piped through a feed backward register 539-2 of programmable hardware block 302-1 to a reverse delay line formed of memory bank M1 of programmable hardware blocks 302-1.

Sample input 801 may be directly piped into preadder 541 of programmable hardware block 302-1, and another input to such preadder 541 of programmable hardware block 302-1 may be piped from a reverse delay line of programmable hardware block 302-1. Output of preadder 541 may be piped into multiplier 542 of programmable hardware block 302-1 for multiplication of coefficients from memory bank M2 of programmable hardware block 302-1, which may be cyclically scheduled under control of sequence data of memory bank M3 of programmable hardware block 302-1. Optionally, adaptive filter input 803 may be provided to memory bank M2 of programmable hardware block 302-1 for multiplication by multiplier 542 thereof and optionally may be provided to an output register 539-3 of programmable hardware block 302-1. Output of multiplier 542 of programmable hardware block 302-1 may be provided as a partial result to output register 539-3 of programmable hardware block 302-1 for accumulation.

Sample input 801 may be piped into preadder 541 of programmable hardware block 302-2 from a reverse delay line and a forward delay line of programmable hardware block 302-2. Output of preadder 541 may be piped into multiplier 542 of programmable hardware block 302-2 for multiplication of coefficients from memory bank M2 of programmable hardware block 302-2, which may be cyclically scheduled under control of sequence data of memory bank M3 of programmable hardware block 302-2. Optionally, adaptive filter input 803 may be provided to memory bank M2 of programmable hardware block 302-2 for multiplication by multiplier 542 thereof and optionally may be provided to an output register 539-3 of programmable hardware block 302-2. Output of multiplier 542 of programmable hardware block 302-2 may be provided to post-adder 543 of programmable hardware block 302-2 for addition with output from output register 539-3 of programmable hardware block 302-1 for accumulation as a partial result in output register 539-3 of programmable hardware block 302-2.

Sample input 801 may be piped through two pipeline stages into multiplier 542 of programmable hardware block 302-3 from a forward delay line of programmable hardware block 302-3. Output of such a forward delay line of programmable hardware block 302-3 may be multiplied by multiplier 542 of programmable hardware block 302-3 with coefficients from memory bank M2 of programmable hardware block 302-3, which may be cyclically scheduled under control of sequence data of memory bank M3 of programmable hardware block 302-3. Optionally, adaptive filter input 803 may be provided to memory bank M2 of programmable hardware block 302-3 for multiplication by multiplier 542 thereof.

Output of multiplier 542 of programmable hardware block 302-3 may be provided to post-adder 543 of programmable hardware block 302-3 for addition with output from output register 539-3 of programmable hardware block 302-2 for accumulation as a result in output register 539-3 of programmable hardware block 302-3 from which sample output 802 may be sourced. For a column cascade configuration, output from programmable hardware block 302-1 may effectively go vertically down in this example in a column to programmable hardware block 302-2, and output of programmable hardware block 302-2 may go horizontally across to programmable hardware block 302-3 in an adjacent column. If another stage is added, output of programmable hardware block 302-3 may effectively go vertically up in this example in a column to programmable hardware block 302-4. However, this or other couplings and/or orientations of programmable hardware blocks 302-1 through 302-4 may be used. Accordingly, it should be appreciated that inter- and intra-column cascades, or a combination thereof, of programmable hardware blocks 302 may be formed.

For a cascade of programmable hardware blocks 302, data wavefronts may be time multiplexed with corresponding coefficient wavefronts for multiplication by time-sharing of multipliers 542 for a cyclic schedule with or without data wrap around. In an implementation, a cascade of time-sharable programmable hardware blocks 302 may be cyclically scheduled with a wraparound for one or more symmetric systolic array filters by accumulating partial results to provide a net result.

Figure 9:
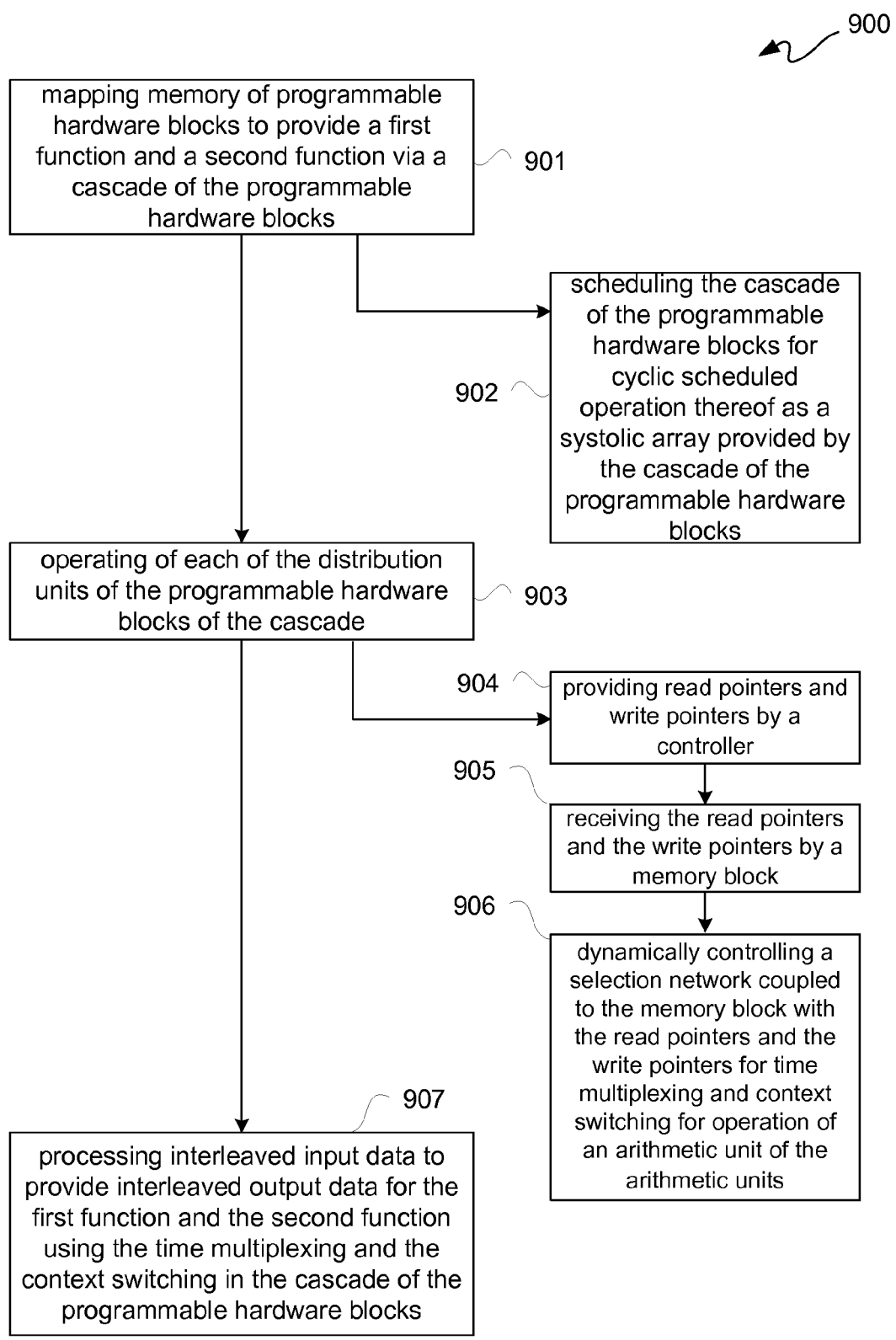
FIG. 9 is a flow diagram depicting an exemplary hardware configuration flow for an integrated circuit device, such as for example the FPGA of FIG. 1.

FIG. 9 is a flow diagram depicting an exemplary hardware configuration flow 900 for an integrated circuit device, such as for example FPGA 100 of FIG. 1. At 901, memory banks of programmable hardware blocks 302 may be mapped to provide a first function and a second function via a cascade of such programmable hardware blocks 302. This mapping at 901 may include at 902 scheduling such cascade of programmable hardware blocks 302 for cyclic scheduled operation thereof as a systolic array provided by such cascade of programmable hardware blocks 302.

At 903, each of the distribution units of programmable hardware blocks 302 of such cascade may be operating. This operating at 903 may include: at 904 providing read pointers and write pointers by a controller as previously described herein; at 905 receiving the read pointers and the write pointers by a memory block as previously described herein; and at 906 dynamically controlling a selection network coupled to the memory block with the read pointers and the write pointers for time multiplexing and context switching for operation of an arithmetic unit of the arithmetic units, as previously described herein.

At 907, such cascade of programmable hardware blocks 302 processes interleaved input data to provide interleaved output data for such first function and such second function using time multiplexing and context switching within such cascade of programmable hardware blocks 302, such as previously described herein.

To recapitulate, an apparatus for time sharing of an arithmetic unit can include: a controller coupled to provide read pointers and write pointers; a memory block coupled to receive the read pointers and the write pointers; and a selection network coupled to the memory block and the arithmetic unit. The memory block can include a write-data network, a read-data network, and memory banks.

One or more of the following may also apply. The arithmetic unit can include a digital signal processing unit. The memory banks can be parsed for data memory, multiplier memory, and sequencer memory. The memory banks can be coupled between the write-data network and the read-data network to input and output delay line data, multiplier data, and scheduler data. The memory banks can include: a first memory bank coupled to provide a downstream delay line as a first portion of the delay line data of the data memory; a second memory bank coupled to provide an upstream delay line as a second portion of the delay line data of the data memory; a third memory bank coupled to provide filter coefficients as the multiplier data of the multiplier memory; and a fourth memory bank configured to provide the scheduler data of the sequencer memory to the selection network. The controller can include a pattern generator coupled to provide the read pointers and write pointers. The first, second, third, and fourth memory banks can be configured as respective circular buffers for a cyclic schedule. The first, second, third, and fourth, memory banks can be respective synchronous memories.

To further recapitulate, a system for time sharing of arithmetic units can include programmable hardware blocks which include distribution units. In this system, each of the distribution units can include: a controller coupled to provide read pointers and write pointers; a memory block coupled to receive the read pointers and the write pointers; and a selection network coupled to the memory block and an arithmetic unit of the arithmetic units. The memory block can include a write-data network, a read-data network, and memory banks. The memory banks can be coupled between the write-data network and the read-data network.

One or more of the following may also apply. The memory banks of each of the distribution units can be parsed for data memory, multiplier memory, and sequencer memory. The memory banks of each of the distribution units can include: a first memory bank coupled to provide a downstream delay line as a first portion of delay line data of the data memory; a second memory bank coupled to provide an upstream delay line as a second portion of delay line data of the data memory; a third memory bank coupled to provide filter coefficients as multiplier data of the multiplier memory; and a fourth memory bank configured to provide scheduler data of the sequencer memory to the selection network. The arithmetic unit can include a digital signal processing unit. The first, second, third, and fourth memory banks can be configured as respective circular buffers for a cyclic schedule. The first, second, third, and fourth memory banks can be respective synchronous memories. The programmable hardware blocks can be cascaded without glue logic between adjacent ones of the programmable hardware blocks to provide at least one periodic function. The programmable hardware blocks can be coupled to one another in a cascade thereof to provide a first periodic function and a second period function as a systolic array. The memory blocks of the programmable hardware blocks can be coupled to provide delay lines, multiplicands, and sequencers to time division multiplex and context switch between the first periodic function and the second periodic function. The programmable hardware blocks can be coupled to one another to provide a first systolic filter and a second systolic filter, respectively, for the first periodic function and the second periodic function. A memory bank of the memory banks can be coupled to a data wraparound path. A first portion of the memory banks can be coupled in a first series in a downstream direction, and a second portion of the memory banks can be coupled in a second series via the data wraparound path to an output of the first series and can be coupled in an upstream direction. The first series and the second series can be coupled to the arithmetic units to provide a first symmetric filter and a second symmetric filter, respectively, for the first systolic filter and the second systolic filter to support multiple channels and multiple bands therein.

To yet further recapitulate, a method for configuration of an integrated circuit device can include mapping memory of programmable hardware blocks to provide a first function and a second function via a cascade of the programmable hardware blocks. The programmable hardware blocks can include arithmetic units and distribution units. Operation of each of the distribution units can include: providing read pointers and write pointers by a controller; receiving the read pointers and the write pointers by a memory block; and dynamically controlling a selection network coupled to the memory block with the read pointers and the write pointers for time multiplexing and context switching for operation of an arithmetic unit of the arithmetic units. Interleaved input data can be processed to provide interleaved output data for the first function and the second function using the time multiplexing and the context switching in the cascade of the programmable hardware blocks.

The mapping can include scheduling the cascade of the programmable hardware blocks for cyclic scheduled operation thereof as a systolic array provided by the cascade of the programmable hardware blocks.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. An apparatus for time sharing of an arithmetic unit, comprising:
    a controller coupled to provide read pointers and write pointers for a pattern representing a function;
    a memory block coupled to receive the read pointers and the write pointers;
    a selection network coupled to the memory block and the arithmetic unit;
    wherein the memory block comprises a write-data network, a read-data network, and memory banks; and
    the memory block configured to receive the read pointers and the write pointers to dynamically control the selection network for time multiplexing and context switching of the arithmetic unit for the pattern.

2. The apparatus according to claim 1, wherein:
    the arithmetic unit comprises a digital signal processing unit;
    the memory banks are parsed for data memory, multiplier memory, and sequencer memory; and
    the memory banks are coupled between the write-data network and the read-data network to input and output delay line data, multiplier data, and scheduler data.

3. The apparatus according to claim 2, wherein the memory banks comprise:
    a first memory bank coupled to provide a downstream delay line as a first portion of the delay line data of the data memory;
    a second memory bank coupled to provide an upstream delay line as a second portion of the delay line data of the data memory;
    a third memory bank coupled to provide filter coefficients as the multiplier data of the multiplier memory; and
    a fourth memory bank configured to provide the scheduler data of the sequencer memory to the selection network.

4. The apparatus according to claim 3, wherein the controller comprises a pattern generator coupled to provide the read pointers and write pointers.

5. The apparatus according to claim 4, wherein the first, second, third, and fourth memory banks are configured as respective circular buffers for a cyclic schedule.

6. The apparatus according to claim 5, wherein the first, second, third, and fourth memory banks are respective synchronous memories.

7. A system for time sharing of arithmetic units, comprising:
    programmable hardware blocks comprising distribution units;
    wherein each of the distribution units comprises:
        a controller coupled to provide read pointers and write pointers for a bit pattern representing a cyclic or periodic function;
        a memory block coupled to receive the read pointers and the write pointers;
        a selection network coupled to the memory block and an arithmetic unit of the arithmetic units;
        wherein the memory block comprises a write-data network, a read-data network, and memory banks;
        wherein the memory banks are coupled between the write-data network and the read-data network; and
        the memory block configured to receive the read pointers and the write pointers to dynamically control the selection network for time multiplexing and context switching of the arithmetic unit for the bit pattern.

8. The system according to claim 7, wherein the memory banks of each of the distribution units are parsed for data memory, multiplier memory, and sequencer memory.

9. The system according to claim 8, wherein the memory banks of each of the distribution units comprise:
    a first memory bank coupled to provide a downstream delay line as a first portion of delay line data of the data memory;
    a second memory bank coupled to provide an upstream delay line as a second portion of delay line data of the data memory;
    a third memory bank coupled to provide filter coefficients as multiplier data of the multiplier memory; and
    a fourth memory bank configured to provide scheduler data of the sequencer memory to the selection network.

10. The system according to claim 9, wherein the arithmetic unit comprises a digital signal processing unit.

11. The system according to claim 9, wherein the first, second, third, and fourth memory banks are configured as respective circular buffers for a cyclic schedule.

12. The system according to claim 9, wherein the first, second, third, and fourth memory banks are respective synchronous memories.

13. The system according to claim 7, wherein the programmable hardware blocks are cascaded without glue logic between adjacent ones of the programmable hardware blocks to provide at least one periodic function.

14. The system according to claim 7, wherein:
the programmable hardware blocks are coupled to one another in a cascade thereof to provide a first periodic function and a second period function as a systolic array; and
the memory blocks of the programmable hardware blocks are coupled to provide delay lines, multiplicands, and sequencers to time division multiplex and context switch between the first periodic function and the second periodic function.

15. The system according to claim 14, wherein the programmable hardware blocks are coupled to one another to provide a first systolic filter and a second systolic filter, respectively, for the first periodic function and the second periodic function.

16. The system according to claim 15, wherein a memory bank of the memory banks is coupled to a data wraparound path.

17. The system according to claim 16, wherein:
a first portion of the memory banks is coupled in a first series in a downstream direction; and
a second portion of the memory banks is coupled in a second series via the data wraparound path to an output of the first series and is coupled in an upstream direction.

18. The system according to claim 17, wherein the first series and the second series are coupled to the arithmetic units to provide a first symmetric filter and a second symmetric filter, respectively, for the first systolic filter and the second systolic filter to support multiple channels and multiple bands therein.

19. A method for configuration of an integrated circuit device, comprising:
mapping memory of programmable hardware blocks to provide a first function and a second function via a cascade of the programmable hardware blocks;
wherein the programmable hardware blocks comprise arithmetic units and distribution units;
operating of each of the distribution units comprising:
providing read pointers and write pointers by a controller;
receiving the read pointers and the write pointers by a memory block; and
dynamically controlling a selection network coupled to the memory block with the read pointers and the write pointers for time multiplexing and context switching for operation of an arithmetic unit of the arithmetic units; and
processing interleaved input data to provide interleaved output data for the first function and the second function using the time multiplexing and the context switching in the cascade of the programmable hardware blocks.

20. The method according to claim 19, wherein the mapping comprises scheduling the cascade of the programmable hardware blocks for cyclic scheduled operation thereof as a systolic array provided by the cascade of the programmable hardware blocks.

* * * * *